Dec. 12, 1944.                  F. ROBERSON                    2,364,918
                         WHEEL HANDLING APPARATUS
                          Filed Jan. 17, 1944         3 Sheets-Sheet 1
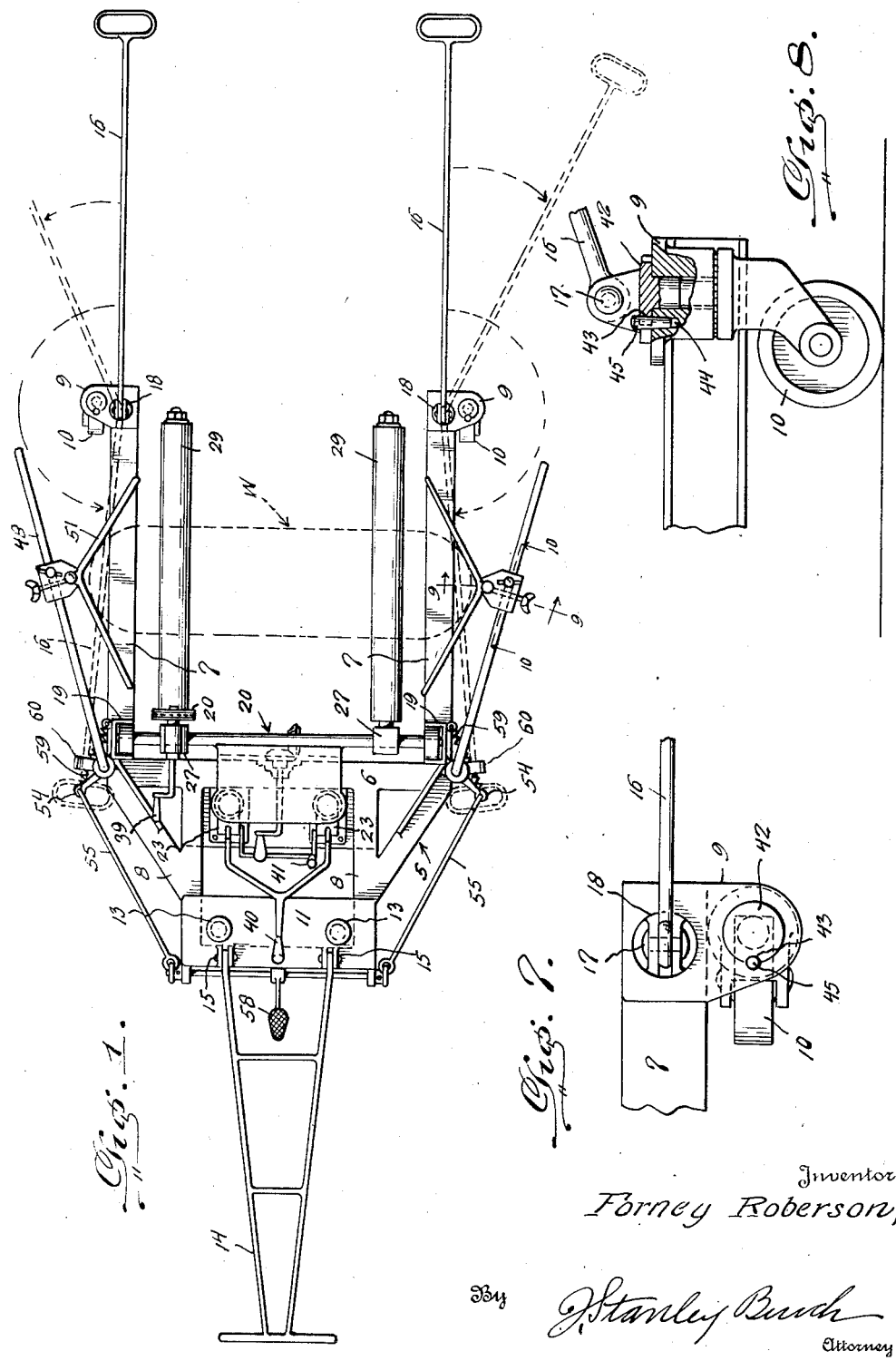
Inventor
Forney Roberson,
By
J. Stanley Burch
Attorney

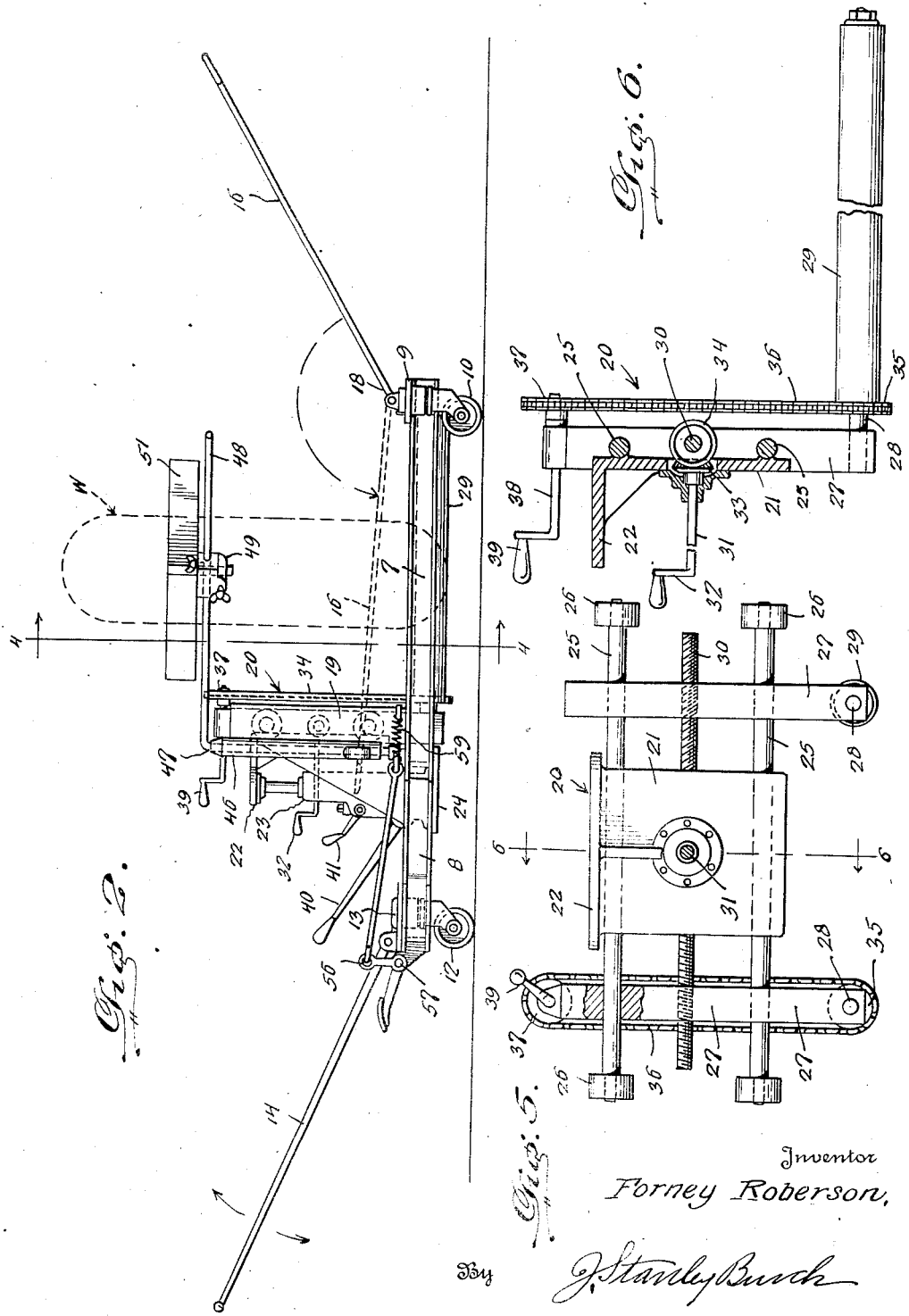

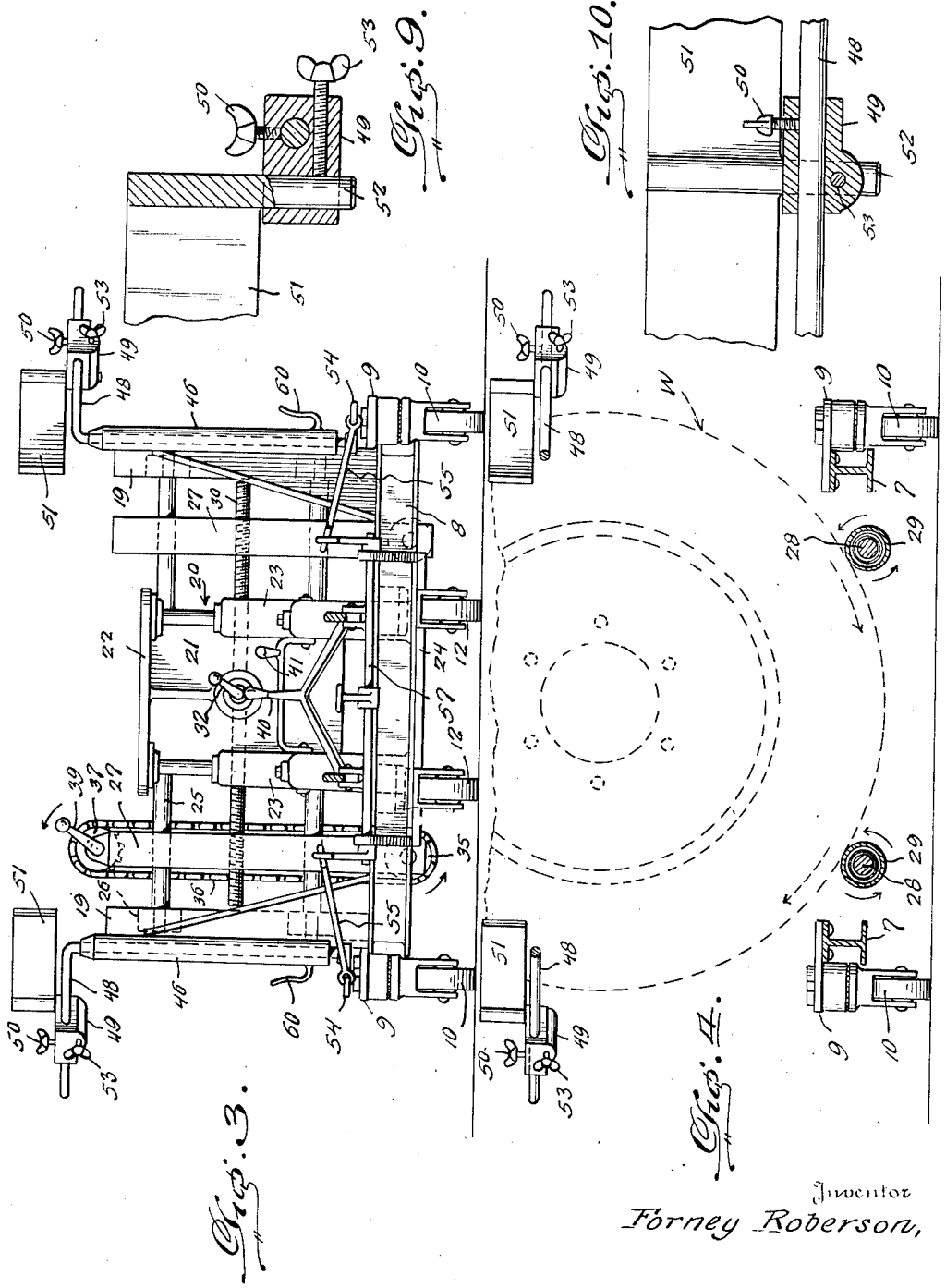

Patented Dec. 12, 1944

2,364,918

UNITED STATES PATENT OFFICE 2,364,918

WHEEL HANDLING APPARATUS

Forney Roberson, Mobile, Ala.

Application January 17, 1944, Serial No. 518,610

3 Claims. (Cl. 214—65.4)

This invention relates to an apparatus for handling large and heavy demountable vehicle wheels and the like, to facilitate mounting or demounting of the same.

The primary object of the present invention is to provide an apparatus by means of which large and heavy vehicle wheels may be effectively handled so as to quickly and easily mount or demount the same with the expenditure of a minimum amount of manual labor.

Another object of the invention is to provide an apparatus of the above kind which is comparatively simple and durable in construction, easy to use, and highly efficient in operation.

Other objects and features of the invention will become apparent from the following description when considered in connection with the accompanying drawings. The invention consists in the novel form, combination and arrangement of parts hereinafter more fully described, shown in the accompanying drawings, and claimed.

In the drawings, wherein like reference characters indicate corresponding parts throughout the several views:

Figure 1 is a top plan view of a wheel handling apparatus constructed in accordance with the present invention.

Figure 2 is a side elevation thereof.

Figure 3 is an enlarged rear elevation of the same.

Figure 4 is a vertical transverse section taken on line 4—4 of Figure 2.

Figure 5 is a view, partly in section and partly in rear elevation, of the vertically adjustable wheel-supporting carriage forming part of the apparatus.

Figure 6 is a vertical section taken on line 6—6 of Figure 5.

Figure 7 is an enlarged fragmentary plan view showing one of the front supporting wheels and the adjacent front handle of the apparatus.

Figure 8 is a side elevation of the construction shown in Figure 7, partly broken away and in section.

Figure 9 is an enlarged fragmentary vertical sectional view of one of the forks which hold the wheel in a vertical position, the view being taken on the plane of line 9—9 of Figure 1; and Figure 10 is a view similar to Figure 9, taken on the plane of line 10—10 of Figure 1.

Referring in detail to the drawings, the present apparatus includes a horizontal frame 5 embodying a transverse beam 6 provided at its ends with forwardly projecting spaced parallel arms 7 and intermediate its ends with suitably braced rearwardly projecting spaced parallel arms 8. Secured on the ends of arms 7 are mounts 9 for swivelled caster wheels 10, and spanning the rear ends of arms 8 is a plate 11 having caster wheels 12 swivelled therein, as at 13. The caster wheels 10 and 12 support the frame in a low position above the ground and permit the apparatus to be readily pushed or pulled in the desired direction. To facilitate such pushing or pulling, a main rear handle 14 is hinged to the plate 11, as at 15, for vertical swinging movement, and supplemental handles 16 are hinged at 17 to brackets 18 that are swivelled on the mounts 9. This permits handles 16 to swing horizontally and vertically.

Rigid with and rising from the rear ends of arms 7 are vertical channels 19 forming guideways for a vertically adjustable wheel-supporting carriage 20. This carriage includes a vertical plate 21 having a rearwardly projecting top flange 22 resting and secured upon a pair of spaced jacks 23 mounted upon a plate 24 secured to the under sides of and connecting the forward ends of arms 8. Welded or otherwise fixed intermediate their ends to the front of plate 21 are spaced horizontal shafts 25, disposed one above the other and having rollers 26 journaled on the ends thereof. The rollers 26 are engaged in the channels 19 to guide the carriage for free vertical movement, and slidable on the shafts 25 at opposite sides of plate 21 are spaced uprights 27 which are provided at their lower ends with forwardly projecting parallel horizontal axles 28 on which are journaled elongated rollers 29. Journaled on the plate 21 between shafts 25 is a horizontal adjusting screw 30 whose oppositely threaded ends extend through and have threaded engagement in the uprights 27. A longitudinally disposed shaft 31 is journaled through plate 21 and has a hard crank 32 on its rear end, a gear 33 being fixed on the forward end of shaft 31 and meshing with a gear 34 secured on screw 30. One of the rollers 29 has a sprocket wheel fixed on its rear end at 35, and a sprocket chain 36 passes around this sprocket wheel and a further sprocket wheel fixed at 37 on a shaft 38 journaled in the upper end of the adjacent upright 27, and provided at its rear end with a hand crank 39. The jacks 23 are preferably of a well-known hydraulic type adapted to be extended by operation of a pump handle 40 and lowered by operation handle 41 used to actuate pressure-release valves of the jacks.

On some occasions, it is desirable to fix the front caster wheels 10 against swivelling and for forward travel of the apparatus straight ahead. For this purpose, the vertical pintles of the wheels 10 have flanges 42 on their upper ends which have marginal notches 43 adapted to be alined with vertical sockets 44 of the mounts 9 so as to receive a locking pin 45.

Fixed to the channels 19 are vertical barrels 46 in which are journaled shafts 47 provided at their upper ends with forwardly projecting relatively long horizontal arms 48. Brackets 49 are slidable on the arms 48 for adjustment longitudinally of the latter, set screws 50 being provided to secure them in adjusted position. Associated with each bracket 49 is a substantially V-shaped horizontal fork 51 arranged to engage and partially embrace the adjacent side of the vehicle wheel near the top to hold it in a vertical position while resting upon the rollers 29, as shown in Figures 1 and 2 by dotted lines. The forks 51 have central depending shafts 52 rotatably received in openings of brackets 49, so that they can be rotarily adjusted to properly engage the wheel. Set screws 53 are used to secure the forks 51 in adjusted position. At their lower ends, the shafts 47 have crank arms 54 connected by links 55 with levers 56 on the ends of a transverse rock shaft 57 journaled on the rear portion of plate 11 and having a central pedal 58. Springs 59 act upon shafts 47 to normally swing the forks 51 inwardly to engage the wheel, and depression of pedal 58 will swing them away from the wheel against the action of springs 59.

In operation, the apparatus is rolled into position so that the rollers 29 are disposed transversely beneath the wheel W near opposite sides of the latter, pedal 58 being depressed to hold the forks 51 outwardly. The crank 32 is then operated to adjust the rollers 29 toward each other or away from each other the proper distance to best engage and support the vehicle wheel, depending upon the size of the latter. Jacks 23 are then extended by operation of handle 40 to elevate the rollers 29 into supporting engagement with the vehicle wheel. Pedal 58 is then released so that forks 51 swing into engagement with the wheel to hold it in a vertical position, said forks being adjusted along the arms 48 and about the axes of shafts 52 if necessary. Thus, the vehicle wheel can be readily demounted when unfastened with respect to its shaft or hub, by simply rolling the apparatus outwardly from the vehicle. To mount the wheel, it is simply positioned on the apparatus, and raised or lowered to the proper position by operation of jacks 23. The vehicle wheel is then rotated by operation of crank 38 to aline the key and key-way or the lug bolts and bolt openings of the vehicle wheel fastening means, whereupon the apparatus may be moved toward the vehicle to mount the wheel and permit easy fastening of the same in place. Due to the various adjustments which are provided, the apparatus can be used effectively to handle both single and dual wheels of many sizes, and its use requires the expenditure of little manual labor in handling even the largest and heaviest wheel that would have to be taken apart for handling them without the apparatus. The handle 16 may engage hooks 60 to be supported in a rearwardly swung-out-of-the-way position.

While I have shown and described what is believed to be a preferred embodiment of the invention, it will be evident that the invention is susceptible of modification and various changes in details of construction.

What I claim is:

1. In a vehicle wheel handling apparatus of the character described, a horizontal wheeled frame, a vertically adjustable vehicle wheel supporting carriage mounted on the frame, and manually releasable means carried by the frame for engaging the upper portion of the vehicle wheel to sustain it in a vertical position on the carriage, said last named means including horizontal swinging wheel-engaging forks mounted on the frame, and yieldable means acting to normally swing said forks toward each other for engagement with the wheel.

2. In a vehicle wheel handling apparatus of the character described, a horizontal wheeled frame, a vertically adjustable vehicle wheel supporting carriage mounted on the frame, and manually releasable means carried by the frame for engaging the upper portion of the vehicle wheel to sustain it in a vertical position on the carriage, said carriage including spaced uprights slidably mounted for horizontal adjustment toward or away from each other, manually operable means for slidably adjusting said uprights, and vehicle wheel supporting rollers rotatably carried by and projecting forwardly from said uprights.

3. In a vehicle wheel handling apparatus of the character described, a horizontal wheeled frame, a vertically adjustable vehicle wheel supporting carriage mounted on the frame, and manually releasable means carried by the frame for engaging the upper portion of the vehicle wheel to sustain it in a vertical position on the carriage, said carriage including spaced uprights slidably mounted for horizontal adjustment toward or away from each other, manually operable means for slidably adjusting said uprights, and vehicle wheel supporting rollers rotatably carried by and projecting forwardly from said uprights, and manually operable means for rotating one of said supporting rollers.

FORNEY ROBERSON.